United States Patent
Imamura et al.

(10) Patent No.: US 8,935,074 B2
(45) Date of Patent: Jan. 13, 2015

(54) APPARATUS TO CONTROL INTERNAL COMBUSTION ENGINE, METHOD FOR CONTROLLING INTERNAL COMBUSTION ENGINE AND NON-TRANSITORY COMPUTER-READABLE RECORDING MEDIUM

(75) Inventors: Kazuhiko Imamura, Wako (JP); Masaaki Nagashima, Wako (JP); Hiroshi Yatani, Wako (JP); Tomoharu Hozumi, Wako (JP); Nobuaki Ito, Wako (JP); Chiharu Shimizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 855 days.

(21) Appl. No.: 13/103,954

(22) Filed: May 9, 2011

(65) Prior Publication Data
US 2011/0307158 A1    Dec. 15, 2011

(30) Foreign Application Priority Data
Jun. 9, 2010  (JP) .................................. 2010-131589

(51) Int. Cl.
*F02D 17/02*    (2006.01)
*F02D 13/06*    (2006.01)
(Continued)

(52) U.S. Cl.
CPC ............ *F02D 13/06* (2013.01); *F02D 41/0087* (2013.01); *F02P 11/00* (2013.01); *F02D 41/1482* (2013.01); *F02D 41/221* (2013.01); *F02D 2041/0012* (2013.01); *Y02T 10/18* (2013.01)
USPC ..................... 701/102; 701/112; 123/198 DB; 123/198 F; 123/481

(58) Field of Classification Search
CPC ..... F02D 45/00; F02D 17/02; F02D 41/0087; F02D 13/06; F02D 2041/0012
USPC ............... 123/198 F, 198 DB, 481, 325, 332; 701/102, 112
See application file for complete search history.

(56) References Cited

U.S. PATENT DOCUMENTS 4,146,006 A * 3/1979 Garabedian ................ 123/198 F
5,884,603 A * 3/1999 Matsuki ..................... 123/333
(Continued)

FOREIGN PATENT DOCUMENTS

JP    01-19056 B2    4/1984
JP    06-108958      4/1994
(Continued)

OTHER PUBLICATIONS

Japanese Office Action for corresponding JP Application No. 2010-131589, Apr. 26, 2012.

*Primary Examiner* — Mahmoud Gimie
*Assistant Examiner* — David Hamaoui
(74) *Attorney, Agent, or Firm* — Mori & Ward, LLP

(57) ABSTRACT

An apparatus to control an internal combustion engine includes a cylinder operation controller configured to switch a cylinder operation between an all-cylinder operation and a cylinder deactivation operation. A deactivation time parameter integrating device is configured to integrate a deactivation time parameter indicating a deactivation time of the part of the plurality of cylinders to calculate an integrated deactivation time parameter. An inhibiting device is configured to inhibit the cylinder deactivation operation if the integrated deactivation time parameter calculated by the deactivation time parameter integrating device is larger than or equal to a reference value. The deactivation time parameter integrating device holds the integrated deactivation time parameter as an initial value after an operation of the internal combustion engine is stopped. The deactivation time parameter integrating device resumes integrating the deactivation time parameter using the initial value when the internal combustion engine restarts.

12 Claims, 11 Drawing Sheets

(51) Int. Cl.
  *F02D 41/00*  (2006.01)
  *F02P 11/00*  (2006.01)
  *F02D 41/14*  (2006.01)
  *F02D 41/22*  (2006.01)

(56) References Cited

U.S. PATENT DOCUMENTS

| | | |
|---|---|---|
| 6,494,087 B2 | 12/2002 | Hatano et al. |
| 6,606,551 B2 | 8/2003 | Ito |
| 7,099,757 B2 * | 8/2006 | Niki et al. ............... 701/22 |
| 7,621,252 B2 * | 11/2009 | Wong et al. ............. 123/198 F |
| 7,765,052 B2 * | 7/2010 | Kaiser et al. ............ 701/103 |
| 2004/0080252 A1 * | 4/2004 | Ito et al. ............... 313/141 |

FOREIGN PATENT DOCUMENTS

| | | |
|---|---|---|
| JP | 10-280998 | 10/1998 |
| JP | 2001-349239 | 12/2001 |
| JP | 2002-161841 | 6/2002 |
| JP | 2002161841 A * | 6/2002 |

* cited by examiner

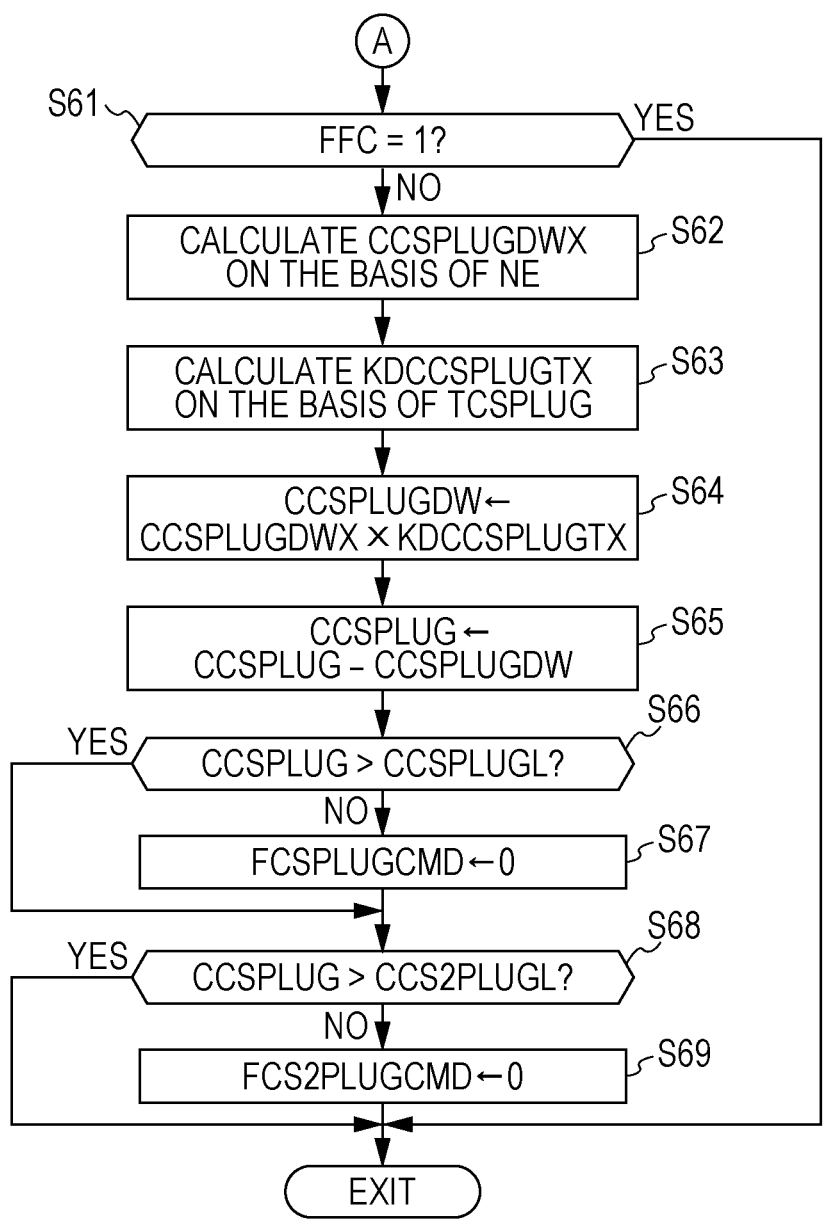

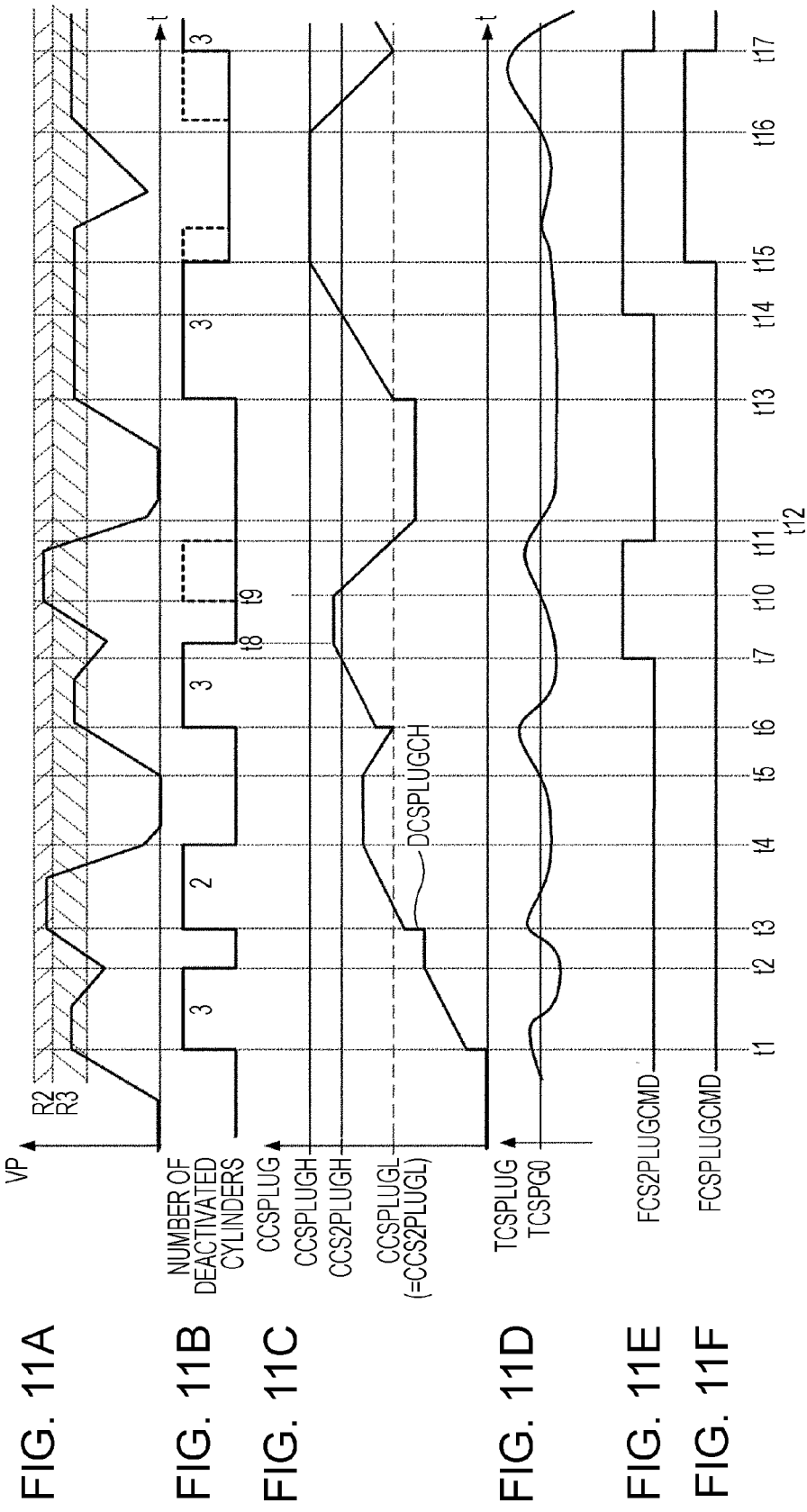

APPARATUS TO CONTROL INTERNAL COMBUSTION ENGINE, METHOD FOR CONTROLLING INTERNAL COMBUSTION ENGINE AND NON-TRANSITORY COMPUTER-READABLE RECORDING MEDIUM

CROSS-REFERENCE TO RELATED APPLICATIONS

The present application claims priority under 35 U.S.C. §119 to Japanese Patent Application No. 2010-131589, filed Jun. 9, 2010, entitled "Apparatus to control internal combustion engine." The contents of this application are incorporated herein by reference in their entirety.

BACKGROUND OF THE INVENTION

1. Field of the Invention

The present invention relates to an apparatus to control an internal combustion engine, a method for controlling an internal combustion engine, and a non-transitory computer-readable recording medium having program code stored thereon which, when executed by a computer, causes the computer to perform an internal combustion engine controlling method for performing a plurality of application programs.

2. Description of the Related Art

A cylinder deactivation operation to deactivate part of multiple cylinders in an internal combustion engine having the cylinder deactivation mechanism has a problem in that the spark plugs of deactivated cylinders are fouled (fouling caused by adhesion of carbon mainly occurs) to be likely to cause accidental fire. Japanese Examined Patent Application Publication No. 1-19056 discloses a control apparatus in which a spark plug fouling detecting unit is provided in order to resolve the above problem and the cylinder deactivation operation is prohibited if a parameter indicating the fouling state of a spark plug detected by the spark plug fouling detecting unit reaches a threshold limit value of firing.

Since it is necessary to provide the spark plug fouling detecting unit in the control apparatus disclosed in Japanese Examined Patent Application Publication No. 1-19056, complicated structure and an increase in cost are caused. Methods of prohibiting the cylinder deactivation operation, for example, if the duration time of the cylinder deactivation operation exceeds a certain determination time can be supposed. However, it is not possible to achieve sufficient anti-fouling effect by such a method if the cylinder deactivation operation having shorter duration time is frequently performed.

SUMMARY OF THE INVENTION

According to one aspect of the present invention, an apparatus to control an internal combustion engine includes a cylinder operation controller, a deactivation time parameter integrating device, and an inhibiting device. The cylinder operation controller is configured to switch, according to an operation state of the internal combustion engine, a cylinder operation between an all-cylinder operation in which all of a plurality of cylinders of the internal combustion engine are activated and a cylinder deactivation operation in which a part of the plurality of cylinders is deactivated. The internal combustion engine includes a cylinder deactivation mechanism to deactivate the part of the plurality of cylinders. The deactivation time parameter integrating device is configured to integrate a deactivation time parameter indicating a deactivation time of the part of the plurality of cylinders to calculate an integrated deactivation time parameter. The inhibiting device is configured to inhibit the cylinder deactivation operation if the integrated deactivation time parameter calculated by deactivation time parameter integrating device is larger than or equal to a reference value. The deactivation time parameter integrating device holds the integrated deactivation time parameter as an initial value after an operation of the internal combustion engine is stopped. The deactivation time parameter integrating device resumes integrating the deactivation time parameter using the initial value when the internal combustion engine restarts.

According to another aspect of the present invention, a method for controlling an internal combustion engine includes switching, according to an operation state of the internal combustion engine, a cylinder operation between an all-cylinder operation in which all of a plurality of cylinders of the internal combustion engine are activated and a cylinder deactivation operation in which a part of the plurality of cylinders is deactivated. A deactivation time parameter indicating a deactivation time of the part of the plurality of cylinders is integrated to calculate an integrated deactivation time parameter. The cylinder deactivation operation is inhibited if the integrated deactivation time parameter is larger than or equal to a determination reference value. The integrated deactivation time parameter as an initial value is held after an operation of the internal combustion engine is stopped. Integrating the deactivation time parameter is resumed using the initial value when the internal combustion engine restarts.

According to further aspect of the present invention, a non-transitory computer-readable recording medium has program code stored thereon which, when executed by a computer, causes the computer to perform an internal combustion engine controlling method for performing a plurality of application programs. The internal combustion engine controlling method includes switching, according to an operation state of the internal combustion engine, a cylinder operation between an all-cylinder operation in which all of a plurality of cylinders of the internal combustion engine are activated and a cylinder deactivation operation in which a part of the plurality of cylinders is deactivated. A deactivation time parameter indicating a deactivation time of the part of the plurality of cylinders is integrated to calculate an integrated deactivation time parameter. The cylinder deactivation operation is inhibited if the integrated deactivation time parameter is larger than or equal to a determination reference value. The integrated deactivation time parameter as an initial value is held after an operation of the internal combustion engine is stopped. Integrating the deactivation time parameter is resumed using the initial value when the internal combustion engine restarts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a flowchart showing the example of the process of determining conditions to inhibit the cylinder deactivation operation;

FIGS. 11A, 11B, 11C, 11D, 11E, and 11F are a time chart for describing the process in FIGS. 4 and 5.

DESCRIPTION OF THE EMBODIMENTS

Figure 1:
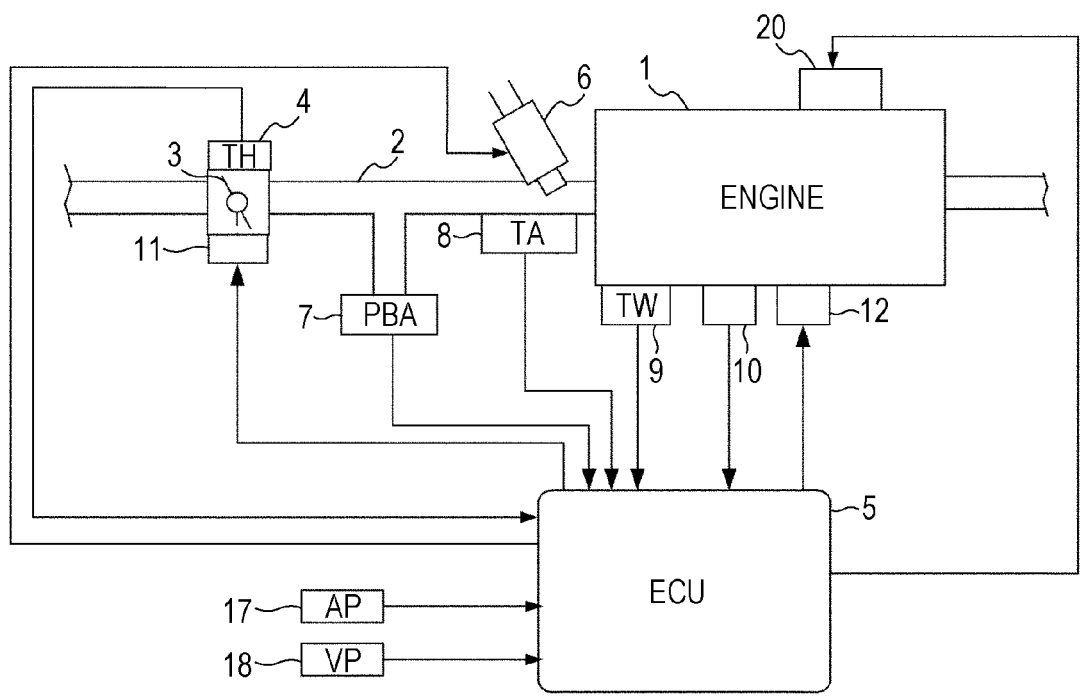
FIG. 1 illustrates an example of the structure of an internal combustion engine and an apparatus for controlling the internal combustion engine according to an embodiment of the present invention.

Embodiments of the present invention will herein be described with reference to the attached drawings, wherein like reference numerals designate corresponding or identical elements throughout the various drawings.

FIG. 1 illustrates an example of the structure of an internal combustion engine and an apparatus for controlling the internal combustion engine according to an embodiment of the present invention. Referring to FIG. 1, a six-cylinder internal combustion engine (hereinafter simply referred to as an engine) 1 includes an intake pipe 2 and a throttle valve 3 is arranged on the intake pipe 2. A throttle-valve opening sensor 4 detecting a valve opening TH of the throttle valve 3 is provided in the throttle valve 3. A signal detected by the throttle-valve opening sensor 4 is supplied to an electronic control unit (hereinafter referred to as an "ECU") 5. An actuator 11 driving the throttle valve 3 is connected to the throttle valve 3, and the actuation of the actuator 11 is controlled by the ECU 5.

A fuel injection valve 6 is provided for each cylinder slightly upstream of an intake valve (not shown). The opening time and the opening timing of the fuel injection valve 6 are controlled in response to a signal supplied from the ECU 5. A spark plug 12 is provided for each cylinder in the engine 1 and an ignition signal is supplied from the ECU 5 to the spark plug 12.

An intake pressure sensor 7 detecting an intake pressure PBA is provided immediately downstream of the throttle valve 3. An intake air temperature sensor 8 detecting an intake air temperature TA is mounted downstream of the intake pressure sensor 7. A coolant temperature sensor 9 detecting a coolant temperature TW of the engine 1 is mounted in the main body of the engine 1. A signal detected by each of the intake pressure sensor 7, the intake air temperature sensor 8, and the coolant temperature sensor 9 is supplied to the ECU 5.

A crank angle position sensor 10 detecting an angle of rotation of a crankshaft (not shown) of the engine 1 is connected to the ECU 5, and a signal corresponding to the angle of rotation of the crankshaft is supplied to the ECU 5. The crank angle position sensor 10 includes a cylinder determination sensor, a top dead center (TDC) sensor, and a crank (CRK) sensor. The cylinder determination sensor outputs a pulse (hereinafter referred to as a "CYL" pulse) at a certain crank angle position of a certain cylinder of the engine 1. The TDC sensor outputs a TDC pulse concerning the TDC at start of an intake process of each cylinder at a crank angle position (every 120 degrees of the crank angle in the six-cylinder engine) before the certain crank angle position. The CRK sensor generates a CRK pulse on a certain crank angle cycle (for example, on a six-degree cycle) shorter than that of the TDC pulse. The CYL pulse, the TDC pulse, and the CRK pulse are supplied to the ECU 5. These signal pulses are used to control a variety of timing including the fuel injection timing and the ignition timing and to detect the number of revolutions NE of the engine (the rotation speed of the engine).

An accelerator sensor 17 and a vehicle speed sensor 18 are connected to the ECU 5. The accelerator sensor 17 detects the degree of depression of an accelerator pedal (hereinafter referred to as "the amount of operation of the accelerator pedal) AP of a vehicle driven by the engine 1. The vehicle speed sensor 18 detects a vehicle speed VP of the vehicle. A signal detected by each of the accelerator sensor 17 and the vehicle speed sensor 18 is supplied to the ECU 5.

The engine 1 has a cylinder deactivation mechanism 20 that deactivates the intake valves and exhaust valves of part of multiple cylinders to deactivate the corresponding cylinders. In the present embodiment, the cylinder deactivation mechanism 20 is configured so as to be capable of performing a three-cylinder deactivation operation in which three cylinders, among the six cylinders, are deactivated and a two-cylinder deactivation operation in which two cylinders, among the six cylinders, are deactivated. The cylinder deactivation mechanism 20 is connected to the ECU 5. The ECU 5 supplies a switching control signal to the cylinder deactivation mechanism 20 to control switching between an all-cylinder operation in which all the cylinders are activated, the two-cylinder deactivation operation, and the three-cylinder deactivation operation in accordance with the vehicle speed VP and the operation state of the engine 1 (to control switching of the number of activated cylinders).

The engine 1 has an exhaust gas recirculation mechanism to recirculate part of the exhaust gas to the intake pipe 2, although the exhaust gas recirculation mechanism is not illustrated in FIG. 1. The ECU 5 drives an exhaust gas recirculation control valve to control the amount of recirculated gas.

The ECU 5 includes an input circuit having functions of, for example, reshaping the waveform of a signal input from each of the various sensors, adjusting the voltage level to a certain level, and converting an analog signal value into a digital signal value; a central processing unit (hereinafter referred to as a "CPU"); a storage circuit storing, for example, various arithmetic programs executed by the CPU and the results of arithmetic operations; an output circuit supplying a drive signal to the fuel injection valve 6; and so on. The ECU 5 controls the opening time of the fuel injection valve 6, the ignition timing of the spark plug 12, and the switching of the number of activated cylinders on the basis of the signals detected by the above sensors. In addition, the ECU 5 calculates a target opening THCMD of the throttle valve 3 on the basis of the amount of operation AP of the accelerator pedal and controls the driving of the actuator 11 so that the detected valve opening TH of the throttle valve 3 coincides with the target opening THCMD.

First to third cylinders (#1 to #3) are deactivated in the three-cylinder deactivation operation and third and fourth cylinders (#3 and #4) are deactivated in the two-cylinder deactivation operation in the present embodiment. Accordingly, since the third cylinder (#3) is deactivated in both of the cylinder deactivation operations, adhesion of carbon on the spark plug caused by the cylinder deactivation is most likely to occur in the third cylinder (#3). In the present embodiment, control of switching of activated cylinders described below is performed in order to reliably prevent the adhesion of carbon in the third cylinder (#3). The spark plugs 12 are constantly electrified even in deactivated cylinders in the present embodiment.

Figure 2:
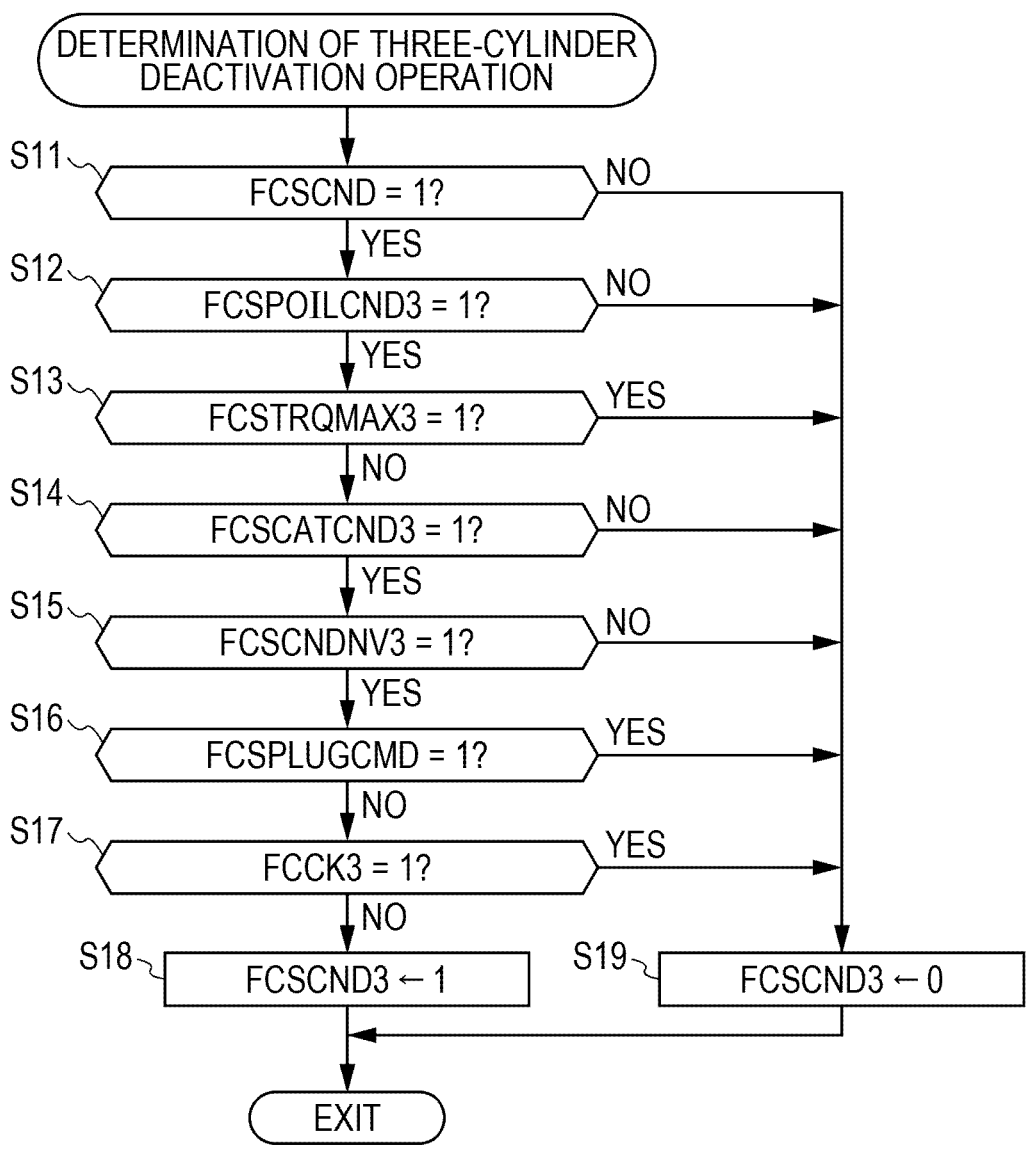
FIG. 2 is a flowchart showing an example of a process of determining execution conditions of a three-cylinder deactivation operation.

FIG. 2 is a flowchart showing an example of a process of determining execution conditions of the three-cylinder deactivation operation. The process is performed by the CPU in the ECU 5 every predetermined time (for example, every 10 milliseconds). The same applies to processes in FIGS. 3 to 5, FIG. 7, and FIG. 8 described below.

Referring to FIG. 2, in Step S11, the CPU determines whether a cylinder deactivation prerequisite flag FCSCND is set to "1." The cylinder deactivation prerequisite flag FCSCND is set to "1" if a certain cylinder deactivation prerequisite to permit the cylinder deactivation operation (the two-cylinder deactivation operation or the three-cylinder deactivation operation) is met. The certain cylinder deactivation prerequisite is met if the following conditions are satisfied: (1) the coolant temperature TW is higher than or equal to a certain water temperature, (2) the apparatus is not in a fail safe operation, (3) air-fuel ratio feedback control is successfully performed, (4) the number of revolutions NE of the engine is smaller than or equal to a certain value, (5) the amount of evaporated fuel occurring in a fuel tank is small, (6) the apparatus is not in a certain high-load operation state in which the throttle valve is substantially fully opened, (7) a cylinder deactivation inhibition request due to shortage of lubricant is not submitted, (8) it is not determined that hard braking is performed, (9) a cylinder deactivation inhibition request due to a certain fault diagnosis process is not submitted, and (10) a cylinder deactivation inhibition request is not submitted from a control unit for an automatic transmission.

If the determination in Step S11 is affirmative (YES), in Step S12, the CPU determines whether a three-cylinder deactivation oil pressure condition flag FCSPOILCND3 is set to "1." The three-cylinder deactivation oil pressure condition flag FCSPOILCND3 is set to "1" if a certain oil pressure condition to permit the three-cylinder deactivation operation (a condition of the operating oil pressure of the cylinder deactivation mechanism 20) is met. The certain oil pressure condition is met if an oil pressure necessary to activate a spool valve used to perform the cylinder deactivation operation is achieved.

If the determination in Step S12 is affirmative (YES), in Step S13, the CPU determines whether a three-cylinder deactivation request torque flag FCSTRQMAX3 is set to "1." The three-cylinder deactivation request torque flag FCSTRQMAX3 is set to "1" if a request torque TRQ of the engine 1 exceeds a maximum output torque TRQMAX3 of the engine 1 in the three-cylinder deactivation operation. The request torque TRQ is set so as to be substantially proportional to the amount of operation AP of the accelerator pedal.

If the determination in Step S13 is negative (NO), in Step S14, the CPU determines whether a three-cylinder deactivation catalyst temperature condition flag FCSCATCND3 is set to "1." The three-cylinder deactivation catalyst temperature condition flag FCSCATCND3 is set to "1" if the temperature of exhaust gas purifying catalyst provided in an exhaust system satisfies a certain temperature condition to permit the three-cylinder deactivation operation. The certain temperature condition is met if the temperature of the exhaust gas purifying catalyst is higher than or equal to an activation temperature and is lower than or equal to a catalyst protection upper limit temperature.

If the determination in Step S14 is affirmative (YES), in Step S15, the CPU determines whether a three-cylinder deactivation NV condition flag FCSCNDNV3 is set to "1." The three-cylinder deactivation NV condition flag FCSCNDNV3 is set to "1" if a certain three-cylinder deactivation NV condition to permit the three-cylinder deactivation operation is met. The certain three-cylinder deactivation NV condition is met if allowable levels of sound and vibration occur during the three-cylinder deactivation operation. If the determination in Step S15 is affirmative (YES), in Step S16, the CPU determines whether a three-cylinder deactivation inhibition flag FCSPLUGCMD is set to "1." The three-cylinder deactivation inhibition flag FCSPLUGCMD is set to "1" if the three-cylinder deactivation operation is inhibited in a process in FIGS. 4 and 5 in order to prevent the spark plug from being fouled.

If the determination in Step S16 is negative (NO), in Step S17, the CPU determines whether a three-cylinder deactivation CC inhibition flag FCCK3 is set to "1." The three-cylinder deactivation CC inhibition flag FCCK3 is set to "1" if it is necessary to inhibit the three-cylinder deactivation operation during cruise control.

If the determination in Step S17 is negative (NO), in Step S18, the CPU determines that the execution conditions of the three-cylinder deactivation operation are met and sets a three-cylinder deactivation operation permission flag FCSCND3 to "1." If the determination in Step S11, S12, S14, or S15 is negative (NO) or the determination in Step S13, S16, or S17 is affirmative (YES), in Step S19, the CPU determines that the execution conditions of the three-cylinder deactivation operation are not met and sets the three-cylinder deactivation operation permission flag FCSCND3 to "0."

Figure 3:
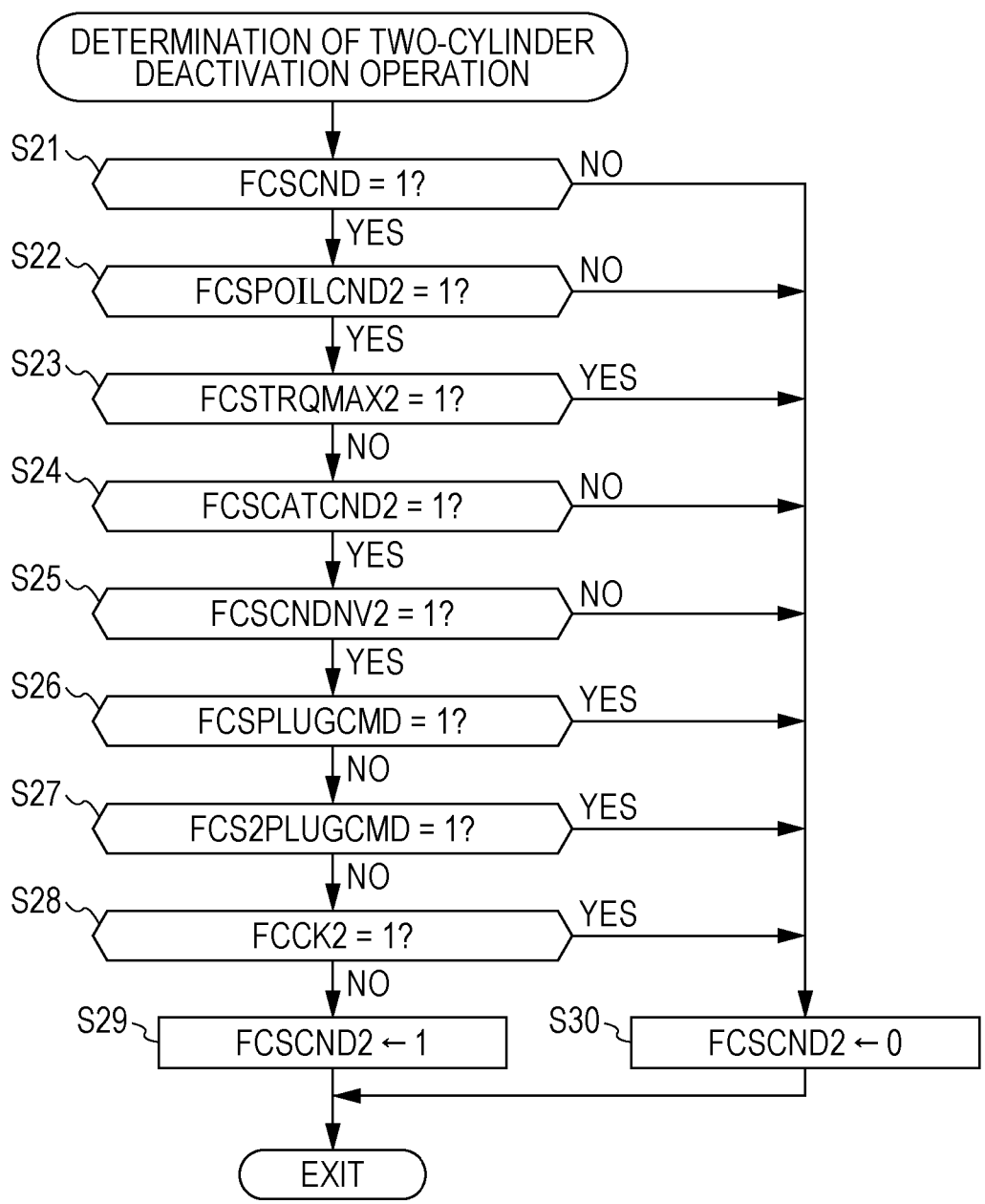
FIG. 3 is a flowchart showing an example of a process of determining execution conditions of a two-cylinder deactivation operation.

FIG. 3 is a flowchart showing an example of a process of determining execution conditions of the two-cylinder deactivation operation. Referring to FIG. 3, in Step S21, the CPU determines whether the cylinder deactivation prerequisite flag FCSCND is set to "1." If the determination in Step S21 is affirmative (YES), in Step S22, the CPU determines whether a two-cylinder deactivation oil pressure condition flag FCSPOILCND2 is set to "1." The two-cylinder deactivation oil pressure condition flag FCSPOILCND2 is set to "1" if a certain oil pressure condition to permit the two-cylinder deactivation operation is met.

If the determination in Step S22 is affirmative (YES), in Step S23, the CPU determines whether a two-cylinder deactivation request torque flag FCSTRQMAX2 is set to "1." The two-cylinder deactivation request torque flag FCSTRQMAX2 is set to "1" if the request torque TRQ of the engine 1 exceeds a maximum output torque TRQMAX2 of the engine 1 in the two-cylinder deactivation operation. If the determination in Step S23 is negative (NO), in Step S24, the CPU determines whether a two-cylinder deactivation catalyst temperature condition flag FCSCATCND2 is set to "1." The two-cylinder deactivation catalyst temperature condition flag FCSCATCND2 is set to "1" if the temperature of the exhaust gas purifying catalyst satisfies a certain temperature condition to permit the two-cylinder deactivation operation.

If the determination in Step S24 is affirmative (YES), in Step S25, the CPU determines whether a two-cylinder deactivation NV condition flag FCSCNDNV2 is set to "1." The two-cylinder deactivation NV condition flag FCSCNDNV2 is set to "1" if a certain two-cylinder deactivation NV condition to permit the two-cylinder deactivation operation is met. The certain two-cylinder deactivation NV condition is met if allowable levels of sound and vibration occur during the two-cylinder deactivation operation. If the determination in Step S25 is affirmative (YES), in Step S26, the CPU determines whether the three-cylinder deactivation inhibition flag FCSPLUGCMD is set to "1." If the determination in Step S26 is negative (NO), in Step S27, the CPU determines whether a two-cylinder deactivation inhibition flag FCS2PLUGCMD is set to "1." The two-cylinder deactivation inhibition flag FCS2PLUGCMD is set to "1" if the two-cylinder deactivation operation is inhibited in the process in FIGS. 4 and 5 in order to prevent the spark plug from being fouled.

If the determination in Step S27 is negative (NO), in Step S28, the CPU determines whether a two-cylinder deactivation CC inhibition flag FCCK2 is set to "1." The two-cylinder deactivation CC inhibition flag FCCK2 is set to "1" if it is necessary to inhibit the two-cylinder deactivation operation during the cruise control.

If the determination in Step S28 is negative (NO), in Step S29, the CPU determines that the execution conditions of the two-cylinder deactivation operation are met and sets a two-cylinder deactivation operation permission flag FCSCND2 is set to "1." If the determination in Step S21, S22, S24, or S25 is negative (NO) or the determination in Step S23, S26, S27, or S28 is affirmative (YES), in Step S30, the CPU determines that the execution conditions of the two-cylinder deactivation operation are not met and sets the two-cylinder deactivation operation permission flag FCSCND2 to "0."

Figure 4:
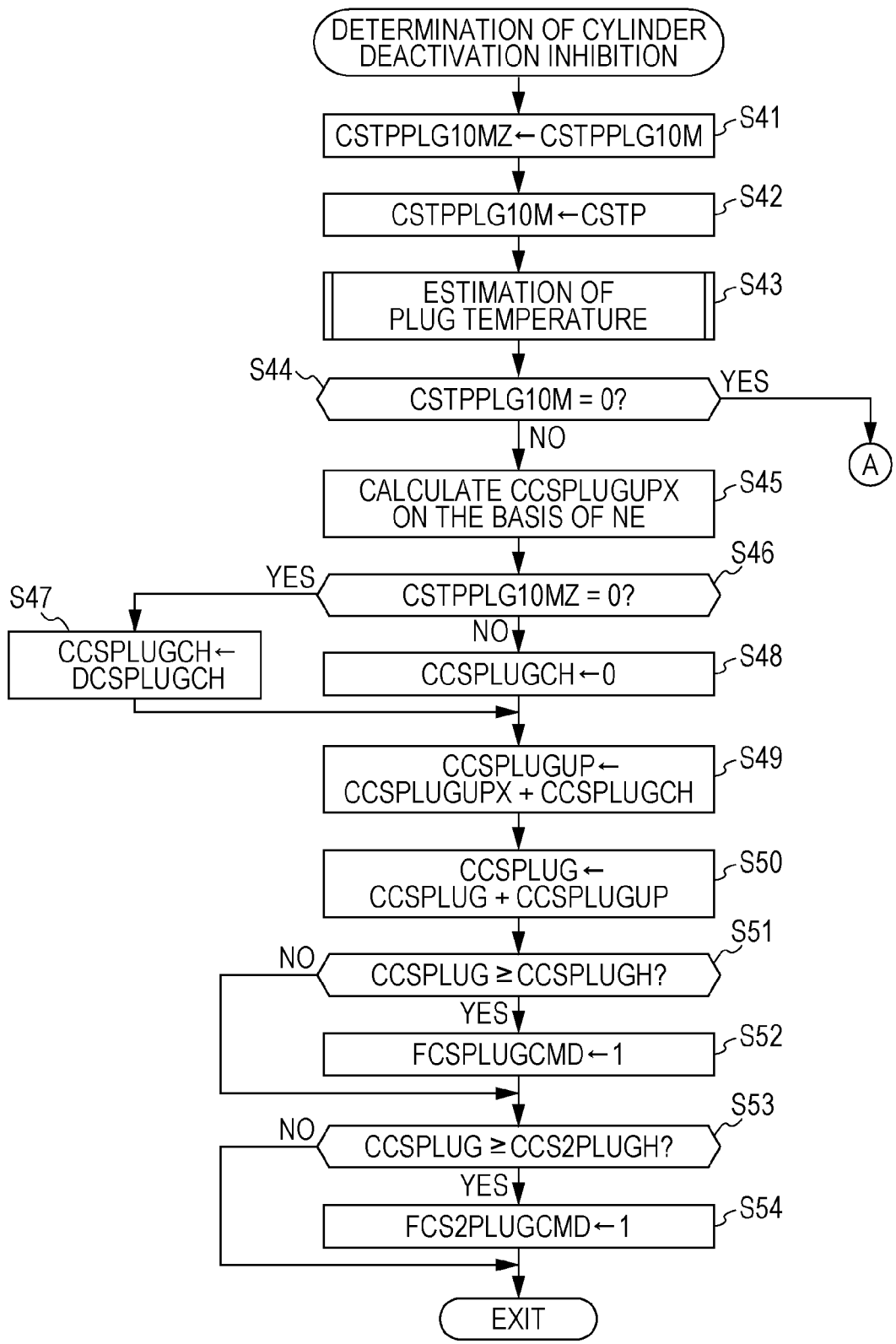
FIG. 4 is a flowchart showing an example of a process of determining conditions to inhibit a cylinder deactivation operation.

FIGS. 4 and 5 are flowcharts showing an example of a process of setting the three-cylinder deactivation inhibition flag FCSPLUGCMD and the two-cylinder deactivation inhibition flag FCS2PLUGCMD.

Referring to FIG. 4, in Step S41, the CPU sets a previous value CSTPPLG10MZ of a cylinder deactivation operation index to a current value CSTPPLG10M. In Step S42, the CPU sets the cylinder deactivation operation index CSTPPLG10M (the current value) to a cylinder activation state variable CSTP. The cylinder activation state variable CSTP is a parameter that is set to "0" during the all-cylinder operation, to "2" during the two-cylinder deactivation operation, and to "3" during the three-cylinder deactivation operation.

Figure 7:
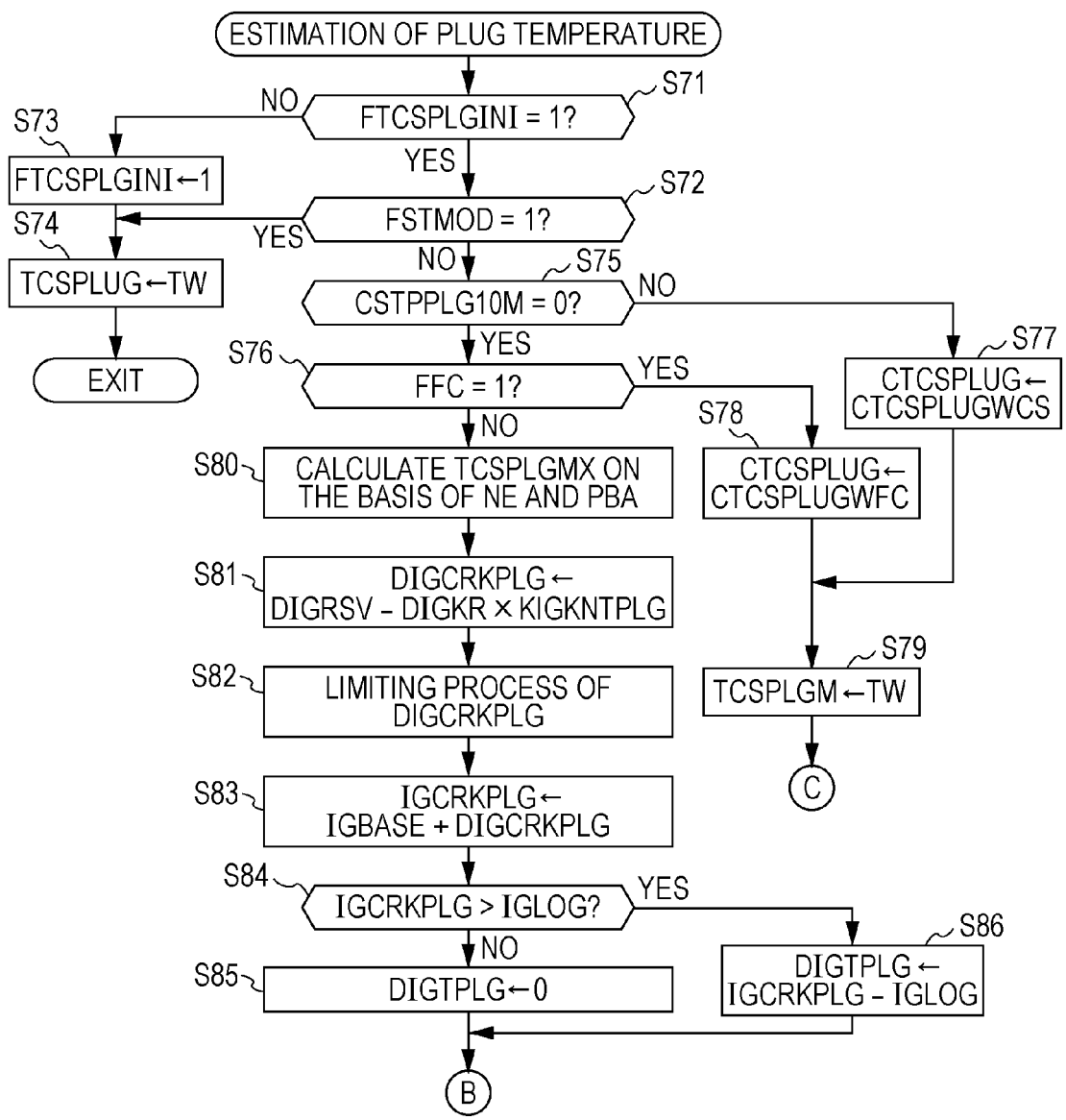
FIG. 7 is a flowchart showing an example of a process of estimating the temperature of a spark plug.
Figure 8:
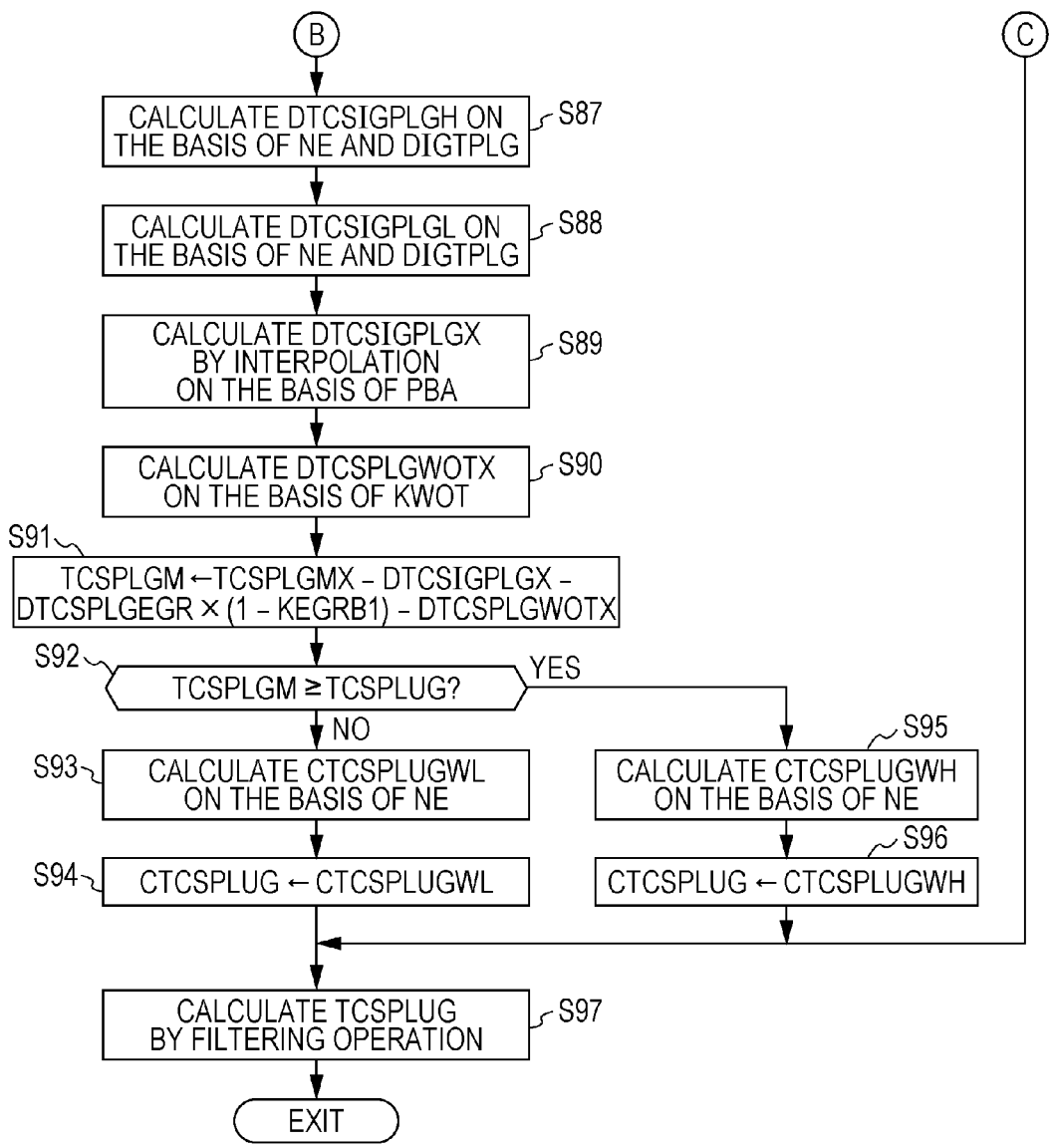
FIG. 8 is a flowchart showing an example of the process of estimating the temperature of the spark plug.

In Step S43, the CPU performs a process of estimating a plug temperature shown in FIGS. 7 and 8 to calculate an estimated plug temperature TCSPLUG, which is an estimated temperature of the spark plug 12 (the spark plug of the third cylinder (#3) in the present embodiment).

Figure 6A:
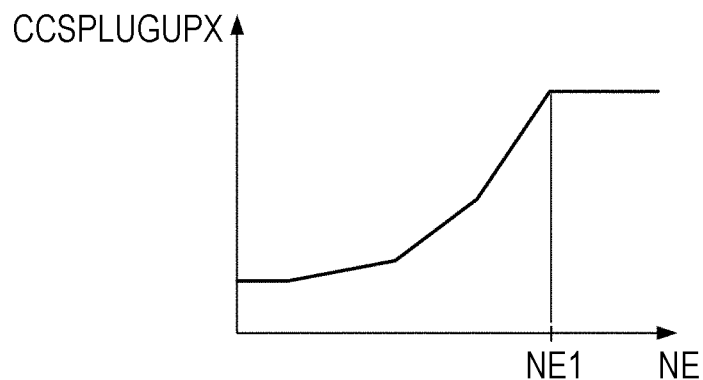
FIGS. 6A, 6B, and 6C show tables referred to in the process in FIG. 4 or FIG. 5.

In Step S44, the CPU determines whether the cylinder deactivation operation index CSTPPLG10M is set to "0." If the determination in Step S44 is negative (NO), that is, if the CPU determines that the apparatus is in the cylinder deactivation operation (the apparatus is performing the three-cylinder deactivation operation or the two-cylinder deactivation operation), in Step S45, the CPU searches a CCSPLUGUPX table shown in FIG. 6A on the basis of the number of revolutions NE of the engine to calculate a count-up basic value CCSPLUGUPX. The CCSPLUGUPX table is set so that the count-up basic value CCSPLUGUPX is increased with the increasing number of revolutions NE of the engine before the number of revolutions NE of the engine reaches a certain number of revolutions NE1.

In Step S46, the CPU determines whether the previous value CSTPPLG10MZ of the cylinder deactivation operation index is set to "0." If the determination in Step S46 is affirmative (YES), that is, immediately after the all-cylinder operation is changed to the cylinder deactivation operation, in Step S47, the CPU sets a count-up correction term CCSPLUGCH to a cylinder deactivation start correction value DCSPLUGCH (for example, the value corresponding to five seconds). Then, the process goes to Step S49. If the determination in Step S46 is negative (NO) and the cylinder deactivation operation is continued from the previous operation, in Step S48, the CPU sets the count-up correction term CCSPLUGCH to "0." Then, the process goes to Step S49.

In Step S49, the CPU applies the count-up basic value CCSPLUGUPX and the count-up correction term CCSPLUGCH to Equation (1) to calculate a count-up count CCSPLUGUP:

$$CCSPLUGUP = CCSPLUGUPX + CCSPLUGCH \quad (1)$$

In Step S50, the CPU increments a cylinder deactivation counter CCSPLUG by the count-up count CCSPLUGUP. CCSPLUG in the right-hand side of Equation (2) is the previous value. The count value of the cylinder deactivation counter CCSPLUG is stored in a non-volatile memory and is held while the engine 1 is stopped. Accordingly, immediately after the activation of the engine 1 is started, the final value in the previous operation of the engine 1 is applied to the right-hand side of Equation (2):

$$CCSPLUG = CCSPLUG + CCSPLUGUP \quad (2)$$

In Step S51, the CPU determines whether the value of the cylinder deactivation counter CCSPLUG is higher than or equal to a three-cylinder deactivation inhibition threshold value CCSPLUGH. If the determination in Step S51 is affirmative (YES), in Step S52, the CPU sets the three-cylinder deactivation inhibition flag FCSPLUGCMD to "1." If the determination in Step S51 is negative (NO), the process goes to Step S53.

In Step S53, the CPU determines whether the value of the cylinder deactivation counter CCSPLUG is higher than or equal to a two-cylinder deactivation inhibition threshold value CCS2PLUGH. The two-cylinder deactivation inhibition threshold value CCS2PLUGH is set to a value that is lower than the three-cylinder deactivation inhibition threshold value CCSPLUGH. If the determination in Step S53 is affirmative (YES), in Step S54, the CPU sets the two-cylinder deactivation inhibition flag FCS2PLUGCMD to "1." If the determination in Step S53 is negative (NO), the process is terminated.

Figure 6B:
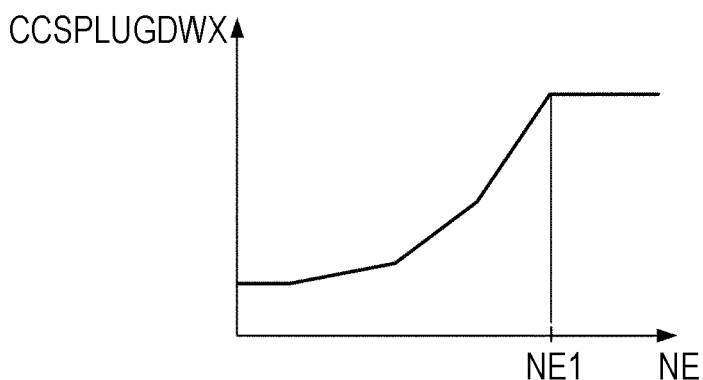

If the determination in Step S44 is affirmative (YES), that is, if the apparatus is in the all-cylinder operation, in Step S61 in FIG. 5, the CPU determines whether a fuel cut flag FFC is set to "1." If the determination in Step S61 is affirmative (YES) and the apparatus is in a fuel cut operation, the process is terminated. If the fuel cut flag FFC is set to "0" and the apparatus is in a normal operation in which fuel supply is performed, in Step S62, the CPU searches a CCSPLUGDWX table shown in FIG. 6B on the basis of the number of revolutions NE of the engine to calculate a count-down basic value CCSPLUGDWX. The CCSPLUGDWX table is set so that the count-down basic value CCSPLUGDWX is increased with the increasing number of revolutions NE of the engine before the number of revolutions NE of the engine reaches the certain number of revolutions NE1.

Figure 6C:
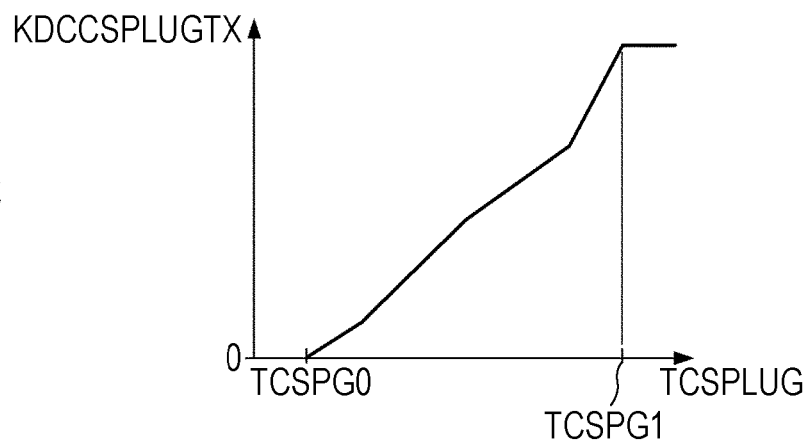

In Step S63, the CPU searches a KDCCSPLUGTX table shown in FIG. 6C on the basis of the estimated plug temperature TCSPLUG calculated in Step S43 to calculate a plug temperature correction factor KDCCSPLUGTX. The KDCCSPLUGTX table is set so that the plug temperature correction factor KDCCSPLUGTX is set to "0" in a range in which the estimated plug temperature TCSPLUG is lower than or equal to a first certain temperature TCSPG0 (for example, 400° C.) and the plug temperature correction factor KDCCSPLUGTX is increased with the increasing estimated plug temperature TCSPLUG in a range from the first certain temperature TCSPG0 to a second certain temperature TCSPG1 (for example, 600° C.).

In Step S64, the CPU applies the count-down basic value CCSPLUGDWX and the plug temperature correction factor KDCCSPLUGTX to Equation (3) to calculate a count-down count CCSPLUGDW:

$$CCSPLUGDW = CCSPLUGDWX \times KDCCSPLUGTX \quad (3)$$

In Step S65, the CPU decrements the cylinder deactivation counter CCSPLUG by the count-down count CCSPLUGDW according to Equation (4):

$$CCSPLUG = CCSPLUG - CCSPLUGDW \quad (4)$$

In Step S66, the CPU determines whether the value of the cylinder deactivation counter CCSPLUG is higher than a three-cylinder deactivation permission threshold value CCSPLUGL. If the determination in Step S66 is negative (NO), in Step S67, the CPU sets the three-cylinder deactivation inhibition flag FCSPLUGCMD to "0." If the determination in Step S66 is affirmative (YES), the process goes to Step S68. The three-cylinder deactivation permission threshold value CCSPLUGL is set to a value that is lower than the three-cylinder deactivation inhibition threshold value CCSPLUGH.

In Step S68, the CPU determines whether the value of the cylinder deactivation counter CCSPLUG is higher than a two-cylinder deactivation permission threshold value CCS2PLUGL. If the determination in Step S68 is negative (NO), in Step S69, the CPU sets the two-cylinder deactivation inhibition flag FCS2PLUGCMD to "0." If the determination in Step S68 is affirmative (YES), the process is terminated. The two-cylinder deactivation permission threshold value CCS2PLUGL is set to a value that is lower than the two-cylinder deactivation inhibition threshold value CCS2PLUGH and that is lower than or equal to the three-cylinder deactivation permission threshold value CCSPLUGL.

FIGS. 7 and 8 are flowcharts showing an example of the process of estimating a plug temperature executed in Step S43 in FIG. 4.

Referring to FIG. 7, in Step S71, the CPU determines whether an initialization flag FTCSPLGINI is set to "1." Since the determination in Step S71 is negative (NO) immediately after the engine is started, in Step S73, the CPU sets the initialization flag FTCSPLGINI to "1." In Step S74, the CPU sets the estimated plug temperature TCSPLUG to the coolant temperature TW of the engine. As the result of Step S73, the determination in Step S71 is made affirmative (YES) and the process goes to Step S72. In Step S72, the CPU determines whether a start mode flag FSTMOD is set to "1." If the start mode flag FSTMOD is set to "1" (the determination in Step S72 is affirmative (YES)) and the engine is being cranked, the process goes to Step S74.

If the determination in Step S72 is negative (NO), in Step S75, the CPU determines whether the cylinder deactivation operation index CSTPPLG10M is set to "1." If the determination in Step S75 is negative (NO) and the apparatus is in the cylinder deactivation operation, in Step S77, the CPU sets a filtering factor CTCSPLUG used in Step S97 described below to a certain cylinder deactivation operation factor value CTCSPLUGWCS (for example, 0.0001). In Step S79, the CPU sets a basic estimated temperature TCSPLGM to the coolant temperature TW of the engine. Then, the process goes to Step S97 in FIG. 8. The basic estimated temperature TCSPLGM is a basic value of the estimated plug temperature calculated in Step S91 described below.

If the determination in Step S75 is affirmative (YES) and the apparatus is in the all-cylinder operation, in Step S76, the CPU determines whether the fuel cut flag FFC is set to "1." If the determination in Step S76 is affirmative (YES), in Step S78, the CPU sets the filtering factor CTCSPLUG to a certain fuel cut operation factor value CTCSPLUGWFC (for example, 0.0005). Then, the process goes to Step S79.

Figure 9A:
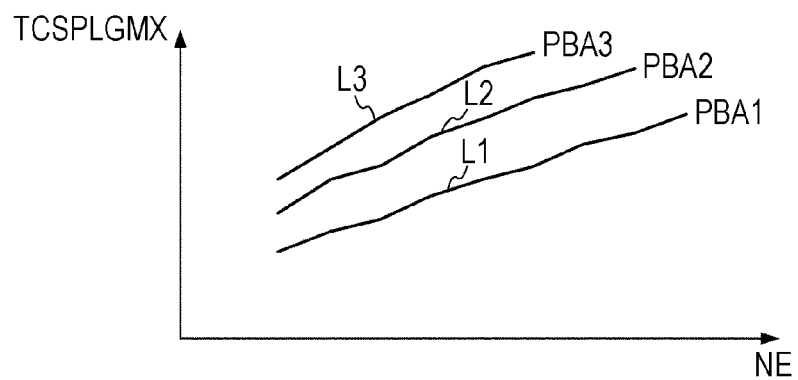
FIGS. 9A and 9B show maps referred to in the process in FIG. 7 or FIG. 8.

If the determination in Step S76 is negative (NO) and the apparatus is in the normal operation, in Step S80, the CPU searches a TCSPLGMX map shown in FIG. 9A on the basis of the number of revolutions NE of the engine and the intake pressure PBA to calculate a basic plug temperature TCSPLGMX.

Referring to FIG. 9A, three curved lines L1, L2, and L3 correspond to certain intake pressures PBA1, PBA2, and PBA3, respectively. The certain intake pressures PBA1, PBA2, and PBA3 establish a relationship PBA1<PBA2<PBA3. Specifically, the TCSPLGMX map is set so that the basic plug temperature TCSPLGMX is increased with the increasing number of revolutions NE of the engine and the basic plug temperature TCSPLGMX is increased with the increasing intake pressure PBA.

In Step S81, the CPU calculates a knock correction term DIGCRKPLG at the ignition timing according to Equation (5). In Equation (5), DIGRSV denotes a knock margin of a basic ignition timing IGBASE (optimal ignition timing that is set on the basis of the number of revolutions NE of the engine and the intake pressure PBA and exhibits a maximum output torque), DIGKR denotes a basic amount of retard for preventing knocking, and KIGKNTPLG denotes a reference retard factor at the basic plug temperature TCSPLGMX. The parameters applied to Equation (5) are calculated in an ignition timing control process (not shown).

$$DIGCRKPLG = DIGRSV - DIGKR \times KIGKNTPLG \quad (5)$$

In Step S82, the CPU performs a limiting process to prevent the knock correction term DIGCRKPLG from exceeding "0".

In Step S83, the CPU applies the basic ignition timing IGBASE and the knock correction term DIGCRKPLG to Equation (6) to calculate a knock corrected ignition timing IGCRKPLG:

$$IGCRKPLG = IGBASE + DIGCRKPLG \quad (6)$$

In Step S84, the CPU determines whether the knock corrected ignition timing IGCRKPLG is larger than an ignition timing IGLOG (the actual ignition timing of the spark plug) (the knock corrected ignition timing IGCRKPL is at the side of the angle of lead, compared with the ignition timing IGLOG). If the determination in Step S84 is negative (NO), in Step S85, the CPU sets an amount of retard DIGTPLG to "0." If the knock corrected ignition timing IGCRKPLG is larger than the ignition timing IGLOG (the determination in Step S84 is affirmative (YES)), in Step S86, the CPU calculates the amount of retard DIGTPLG according to Equation (7):

$$DIGTPLG = IGCRKPLG - IGLOG \quad (7)$$

Figure 9B:
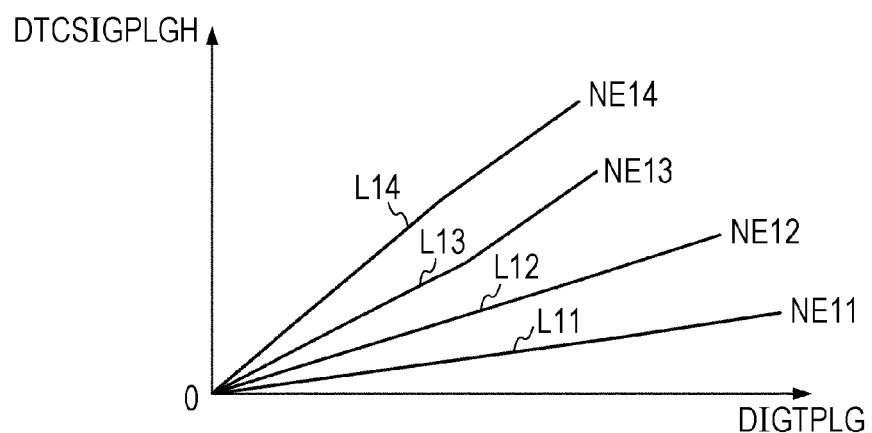

In Step S87 in FIG. 8, the CPU searches a DTCSIGPLGH map shown in FIG. 9B on the basis of the number of revolutions NE of the engine and the amount of retard DIGTPLG to calculate an amount of high-load correction DTCSIGPLGH. The amount of high-load correction DTCSIGPLGH is an amount of correction corresponding to the high-load operation state in which the throttle valve is substantially fully opened (a state in which the intake pressure PBA is equal to a certain high intake pressure PBDPLGIGH, refer to FIG. 10A). Referring to FIG. 9B, four lines L11, L12, L13 and L14 correspond to certain numbers of revolutions NE11, NE12, NE13, and NE14, respectively. The certain numbers of revolutions NE11, NE12, NE13, and NE14 establish a relationship NE11<NE12<NE13<NE14. Specifically, the DTCSIG-PLGH map is set so that the amount of high-load correction DTCSIGPLGH is increased with the increasing amount of retard DIGTPLG and the rate of change (gradient) with respect to the increase in the amount of retard DIGTPLG is increased with the increasing number of revolutions NE of the engine. If the amount of retard DIGTPLG is equal to "0," the amount of high-load correction DTCSIGPLGH is set to "0" regardless of the number of revolutions NE of the engine.

In Step S88, the CPU searches a DTCSIGPLGL map (not shown) on the basis of the number of revolutions NE of the engine and the amount of retard DIGTPLG to calculate an amount of low-load correction DTCSIGPLGL. The amount of low-load correction DTCSIGPLGL is an amount of correction corresponding to a certain load operation state (a state in which the intake pressure PBA is equal to a certain low intake pressure PBDPLGIGL, refer to FIG. 10A). Like the DTCSIGPLGH map, the DTCSIGPLGL map is also set so that the amount of low-load correction DTCSIGPLGL is increased with the increasing amount of retard DIGTPLG and the rate of change (gradient) with respect to the increase in the amount of retard DIGTPLG is increased with the increasing number of revolutions NE of the engine.

Figure 10A:
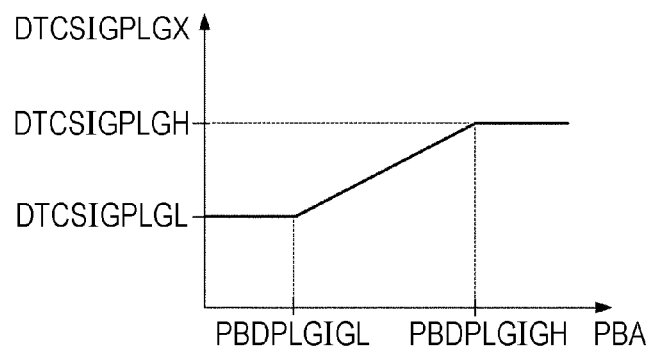
FIGS. 10A, 10B, and 10C show tables referred to the process in FIG. 8.

In Step S89, the CPU performs interpolation on the basis of the intake pressure PBA by using the amount of high-load correction DTCSIGPLGH and the amount of low-load correction DTCSIGPLGL, as shown in FIG. 10A, to calculate an amount of ignition timing correction DTCSIGPLGX.

Figure 10B:
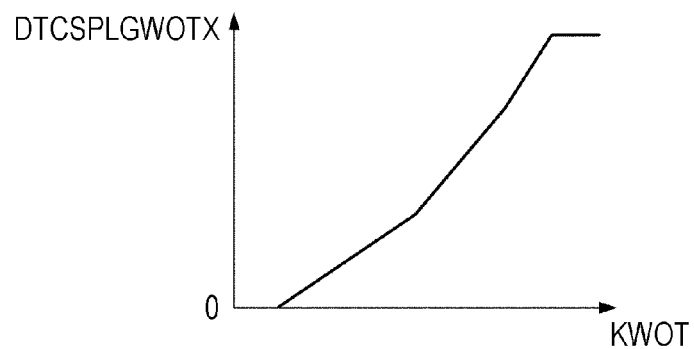

In Step S90, the CPU searches a DTCSPLGWOTX table shown in FIG. 10B on the basis of a high-load fuel weighting factor KWOT, which is a correction factor of the fuel injection time, to calculate an amount of high-load operation correction DTCSPLGWOTX. The DTCSPLGWOTX table is set so that the amount of high-load operation correction DTCSPLG-WOTX is increased with the increasing high-load fuel weighting factor KWOT.

In Step S91, the CPU applies the basic plug temperature TCSPLGMX, the amount of ignition timing correction DTC-SIGPLGX, and the amount of high-load operation correction DTCSPLGWOTX to Equation (8) to calculate the basic estimated temperature TCSPLGM. In Equation (8), DTCS-PLGEGR denotes a certain amount of exhaust gas recirculation (EGR) correction used to correct the effect of the exhaust gas recirculation and (1−KEGRB1) denotes a parameter corresponding to an exhaust gas recirculation ratio (the ratio of the recirculated exhaust gas to cylinder intake gas), which is calculated in a fuel injection control process (not shown).

$$TCSPLGM=TCSPLGMX-DTCSIGPLGX-DTCSPLGEGR \times (1-KEGRB1)-DTCSPLGWOTX \quad (8)$$

In Step S92, the CPU determines whether the basic estimated temperature TCSPLGM is higher than or equal to the estimated plug temperature TCSPLUG (the previous value). If the determination in Step S92 is negative (NO), in Step S93, the CPU searches a CTCSPLUGWL table shown in FIG. 10C on the basis of the number of revolutions NE of the engine to calculate a (filtering) factor value CTCSPLUGWL when the plug temperature is decreasing. In Step S94, the CPU sets the filtering factor CTCSPLUG to the factor value CTCS-PLUGWL. The CTCSPLUGWL table is set so that the factor value CTCSPLUGWL is increased with the increasing number of revolutions NE of the engine in a range in which the number of revolutions NE of the engine is smaller than a certain number of revolutions NE21.

Figure 10C:
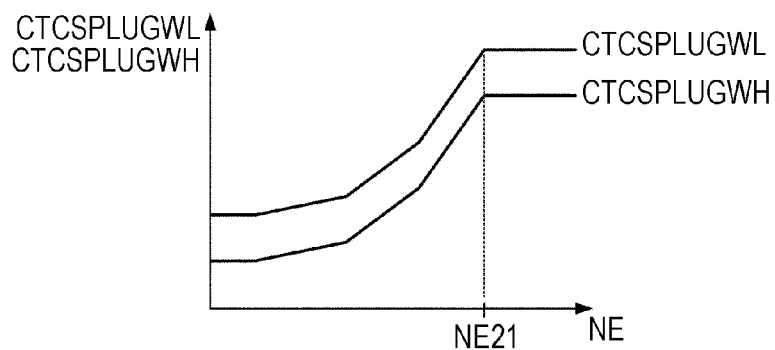

If the determination in Step S92 is affirmative (YES), in Step S95, the CPU searches a CTCSPLUGWH table shown in FIG. 10C on the basis of the number of revolutions NE of the engine to calculate a (filtering) factor value CTCS-PLUGWH when the plug temperature is increasing. In Step S96, the CPU sets the filtering factor CTCSPLUG to the factor value CTCSPLUGWH. The CTCSPLUGWH table is set so that the factor value CTCSPLUGWH is increased with the increasing number of revolutions NE of the engine in the range in which the number of revolutions NE of the engine is smaller than the certain number of revolutions NE21.

In Step S97, the CPU performs a filtering operation by applying the basic estimated temperature TCSPLGM and the filtering factor CTCSPLUG to Equation (9) to calculate the estimated plug temperature TCSPLUG. TCSPLUG in the right-hand side of Equation (9) is the previously calculated value. Since the basic estimated temperature TCSPLGM is not calculated (updated) when the process goes to Step S97 through Step S79, the value that is recently calculated is applied to Equation (9).

$$TCSPLUG=CTCSPLUG \times TCSPLGM+(1-CTCSPLUG) \times TCSPLUG \quad (9)$$

Since the estimated plug temperature TCSPLUG is calculated on the basis of the number of revolutions NE of the engine, the intake pressure PBA, the coolant temperature TW, the ignition timing IGLOG, the exhaust gas recirculation ratio (1−KEGRB1), and the high-load fuel weighting factor KWOT in the process in FIGS. 7 and 8, it is possible to correctly calculate the estimated plug temperature by the relatively simple operations.

FIGS. 11A to 11F are a time chart for describing the process in FIGS. 4 and 5. FIGS. 11A to 11F show transition of the vehicle speed VP, the number of deactivated cylinders, the count value of the cylinder deactivation counter CCSPLUG, the estimated plug temperature TCSPLUG, the two-cylinder deactivation inhibition flag FCS2PLUGCMD, and the three-cylinder deactivation inhibition flag FCSPLUGCMD. An area R2 in FIG. 11A shows a vehicle speed area in which the execution conditions of the three-cylinder deactivation operation are met and an area R3 in FIG. 11A shows a vehicle speed area in which the execution conditions of the two-cylinder deactivation operation are met. Referring to FIG. 11B, the three-cylinder deactivation operation is performed in periods denoted by "3", the two-cylinder deactivation operation is performed in a period denoted by "2", and the all-cylinder operation is performed in periods having no figures. The cylinder deactivation operation is performed in periods indicated by broken lines in FIG. 11B when the cylinder deactivation inhibition by the process in FIGS. 4 and 5 is not performed.

As shown the exemplary operation in FIG. 11C, the three-cylinder deactivation permission threshold value CCS-PLUGL is set to be equal to the two-cylinder deactivation permission threshold value CCS2PLUGL.

The three-cylinder deactivation operation is performed in a period from a time t1 to a time t2, and the two-cylinder deactivation operation is performed in a period from a time t3 to a time t4. Accordingly, the cylinder deactivation counter CCSPLUG is counted up. At a time t5, the count down of the cylinder deactivation counter CCSPLUG is started because the estimated plug temperature TCSPLUG exceeds the first certain temperature TCSPG0. At a time t6, the three-cylinder deactivation operation is started. At a time t7, the two-cylinder deactivation inhibition flag FCS2PLUGCMD is set to "1" because the value of the cylinder deactivation counter CCS-PLUG reaches the two-cylinder deactivation inhibition threshold value CCS2PLUGH. Since the three-cylinder deactivation operation is not inhibited at this time, it is continued to a time t8. Although the two-cylinder deactivation operation is capable of being performed at a time t9, the two-cylinder deactivation operation is not performed because it is inhibited.

In a period from a time t10 to t12, the count down of the cylinder deactivation counter CCSPLUG is performed. At a time t11, the two-cylinder deactivation inhibition flag FCS2PLUGCMD is returned to "0" because the value of the cylinder deactivation counter CCSPLUG reaches the two-cylinder deactivation permission threshold value CCS2PLUGL.

At a time t13, the three-cylinder deactivation operation is started. At a time t14, the two-cylinder deactivation inhibition flag FCS2PLUGCMD is set to "1" because the value of the cylinder deactivation counter CCSPLUG exceeds the two-cylinder deactivation inhibition threshold value CCS2PLUGH. At a time t15, the three-cylinder deactivation inhibition flag FCSPLUGCMD is set to "1" because the value of the cylinder deactivation counter CCSPLUG reaches the three-cylinder deactivation inhibition threshold value CCSPLUGH. Accordingly, the three-cylinder deactivation operation is terminated at the time t15.

At a time t16, the count down of the cylinder deactivation counter CCSPLUG is started. At a time t17, both the two-cylinder deactivation inhibition flag FCS2PLUGCMD and the three-cylinder deactivation inhibition flag FCSPLUGCMD are returned to "0" and the three-cylinder deactivation operation is simultaneously started because the value of the cylinder deactivation counter CCSPLUG reaches the three-cylinder deactivation permission threshold value CCSPLUGL (=the two-cylinder deactivation permission threshold value CCS2PLUGL).

As described above, according to the embodiments of the present invention, the count value corresponding to the integrated value of the cylinder deactivation times is calculated with the cylinder deactivation counter CCSPLUG. The two-cylinder deactivation operation is inhibited if the value of the cylinder deactivation counter CCSPLUG is higher than or equal to the two-cylinder deactivation inhibition threshold value CCS2PLUGH, and the two-cylinder deactivation operation and the three-cylinder deactivation operation are inhibited if the value of the cylinder deactivation counter CCSPLUG is higher than or equal to the three-cylinder deactivation inhibition threshold value CCSPLUGH. The count value of the cylinder deactivation counter CCSPLUG is held after the engine 1 is stopped, and the integration with the cylinder deactivation counter CCSPLUG is preformed by using the held count value as an initial value at start of the next operation of the internal combustion engine. It is confirmed that adhesion of carbon on the spark plug depends on the integrated value of the times when the cylinder deactivation operation is performed. Accordingly, the integration can be performed with the cylinder deactivation counter CCSPLUG while holding the count value corresponding to the integrated deactivation time also when the operation of the engine is stopped to reliably prevent the adhesion of carbon with a simple structure, thus keeping stable combustion in all the cylinders.

In addition, the estimated plug temperature TCSPLUG is calculated depending on the operation state of the engine. If the estimated plug temperature TCSPLUG is higher than the first certain temperature TCSPG0, the plug temperature correction factor KDCCSPLUGTX is set to a value that is higher than "0" (FIG. 6C) and the count down of the cylinder deactivation counter CCSPLUG is started. Since the adhering carbon is removed by the combustion if the temperature of the spark plug is higher than the first certain temperature TCSPG0, the count down of the cylinder deactivation counter CCSPLUG can be performed to correctly estimate the state of adhesion of carbon from the value of the cylinder deactivation counter CCSPLUG. Furthermore, since the count-down count CCSPLUGDW is set so as to be increased with the increasing estimated plug temperature TCSPLUG (FIG. 6C), it is possible to more appropriately reflect the effect of the estimated plug temperature TCSPLUG.

At switching from the all-cylinder operation to the cylinder deactivation operation, a cylinder deactivation start correction value DCSPLGCH is added to the value of the cylinder deactivation counter CCSPLUG. It is confirmed that the amount of adhesion of carbon tends to increase with the increasing number of times when the all-cylinder operation is switched to the cylinder deactivation operation. Accordingly, the cylinder deactivation start correction value DCSPLGCH can be added to the count value of the cylinder deactivation counter CCSPLUG at the switching to reflect the effect of the number of times of switching on the value of the cylinder deactivation counter CCSPLUG, thereby more correctly estimating the state of adhesion of carbon.

The control of switching between the two-cylinder deactivation operation, the three-cylinder deactivation operation, and the all-cylinder operation is performed. The two-cylinder deactivation operation is inhibited if the value of the cylinder deactivation counter CCSPLUG exceeds the two-cylinder deactivation inhibition threshold value CCS2PLUGH, and the three-cylinder deactivation operation is inhibited if the value of the cylinder deactivation counter CCSPLUG exceeds the three-cylinder deactivation inhibition threshold value CCSPLUGH. If the value of the cylinder deactivation counter CCSPLUG is increased to exceed the two-cylinder deactivation inhibition threshold value CCS2PLUGH, only the two-cylinder deactivation operation having smaller number of deactivated cylinders is inhibited. As a result, it is possible to achieve the combustion effect of carbon in the relatively high-load operation and to improve the mileage of the three-cylinder deactivation operation in the low-load operation. In addition, if the two-cylinder deactivation inhibition threshold value CCS2PLUGH is increased to exceed the three-cylinder deactivation inhibition threshold value CCSPLUGH, both the two-cylinder deactivation operation and the three-cylinder deactivation operation are inhibited to reliably remove the adhering carbon.

In the above embodiments, the ECU 5 composes a number-of-activated-cylinders control unit, a deactivation time parameter integrating unit, a deactivation time parameter decrementing unit, an inhibiting unit, a spark plug temperature estimating unit, and an addition unit. Specifically, the processes in FIGS. 2 and 3 correspond to the number-of-activated-cylinders control unit, Steps S44, S45, and S50 in FIG. 4 correspond to the deactivation time parameter integrating unit, Steps S61 to S65 in FIG. 5 correspond to the deactivation time parameter decrementing unit, Steps S51 to S54 in FIG. 4 correspond to the inhibiting unit, the process in FIGS. 7 and 8 corresponds to the spark plug temperature estimating unit, and Steps S46 to S49 in FIG. 4 correspond to the addition unit.

While the preferred embodiments of the present invention have been described above, the present invention is not limited to the above embodiments and it will be recognized and understood that various modifications can be made in the embodiment of the invention. Although the two kinds of deactivation operations having different numbers of deactivated cylinders are exemplified in the above embodiments, the embodiment of the present invention is applicable to an apparatus of controlling, for example, an internal combustion engine that performs only the three-cylinder deactivation operation as the cylinder deactivation operation. The embodiment of the present invention is not limited to the apparatus of controlling the six-cylinder internal combustion engine and is also applicable to an apparatus of controlling an internal combustion engine capable of deactivating part of multiple cylinders.

Although the cylinder deactivation mechanism described above deactivates the intake valve and the exhaust valve, the cylinder deactivation mechanism may deactivate only the intake valve.

In addition, the embodiment of the present invention is also applicable to an apparatus of controlling a ship propulsion engine, such as an outboard motor, which has a crankshaft extending vertically and which is capable of switching the number of activated cylinders.

According to the embodiment of the present invention, a deactivation time parameter indicating a deactivation time of part of cylinders is integrated to calculate an integrated deactivation time parameter, and the cylinder deactivation operation is inhibited if the integrated deactivation time parameter is higher than or equal to a certain determination value. The integrated deactivation time parameter is held also after the internal combustion engine is stopped and the integration is started by using the held integrated deactivation time parameter as an initial value at start of the next operation of the internal combustion engine. It is confirmed that the state of adhesion of carbon on the spark plug depends on the integrated value of the times when the cylinder deactivation operation is performed. Accordingly, the deactivation time parameter is integrated while holding the integrated deactivation time parameter also while the operation of the internal combustion engine is stopped to reliably prevent the adhesion of carbon with a simple structure, thus keeping stable combustion in all the cylinders.

According to the embodiment of the present invention, an estimated spark plug temperature is calculated and the integrated deactivation time parameter is decremented if the estimated spark plug temperature is higher than a certain value. Since adhering carbon is removed by combustion if the temperature of the spark plug is higher than the certain value, the integrated deactivation time parameter is decremented to correctly estimate the state of adhesion of carbon from the integrated deactivation time parameter.

According to the embodiment of the present invention, a certain value is added to the integrated deactivation time parameter at switching from the all-cylinder operation to the cylinder deactivation operation. It is confirmed that the amount of adhesion of carbon tends to increase with the increasing number of times when the all-cylinder operation is switched to the cylinder deactivation operation. Accordingly, the certain value is added to the integrated deactivation time parameter at the switching to reflect the effect of the number of times of switching on the integrated deactivation time parameter, thereby more correctly estimating the state of adhesion of carbon.

According to the embodiment of the present invention, the switching between the first cylinder deactivation operation in which the first certain number of cylinders are deactivated, the second cylinder deactivation operation in which the second certain number of cylinders are deactivated, and the all-cylinder operation is controlled. The first cylinder deactivation operation is inhibited if the integrated deactivation time parameter is larger than or equal to the first certain determination value, and both of the first and second cylinder deactivation operations are inhibited if the integrated deactivation time parameter is larger than or equal to the second certain determination value. If the integrated deactivation time parameter is increased to exceed the first certain determination value, only the first cylinder deactivation operation having smaller number of deactivated cylinders is inhibited. As a result, it is possible to achieve the combustion effect of carbon in the relatively high-load operation and to improve the mileage of the second cylinder deactivation operation in the low-load operation. In addition, if the integrated deactivation time parameter is increased to exceed the second certain determination value, both of the first and second cylinder deactivation operations are inhibited to reliably remove the adhering carbon.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus to control an internal combustion engine, comprising:
   a cylinder operation controller configured to switch, according to an operation state of the internal combustion engine, a cylinder operation between an all-cylinder operation in which all of a plurality of cylinders of the internal combustion engine are activated and a cylinder deactivation operation in which a part of the plurality of cylinders is deactivated, the internal combustion engine including a cylinder deactivation mechanism to deactivate the part of the plurality of cylinders;
   a deactivation time parameter counting device configured to count a deactivation time parameter indicating a deactivation time of the part of the plurality of cylinders to calculate a counted deactivation time parameter; and
   an inhibiting device configured to inhibit the cylinder deactivation operation if the counted deactivation time parameter calculated by the deactivation time parameter counting device is larger than or equal to a determination reference value,
   wherein the deactivation time parameter counting device holds the counted deactivation time parameter as an initial value after an operation of the internal combustion engine is stopped,
   wherein the deactivation time parameter counting device resumes counting the deactivation time parameter using the initial value when the internal combustion engine restarts,
   wherein the cylinder operation controller is configured to switch the cylinder operation among a first cylinder deactivation operation in which a first number of cylinders among the plurality of cylinders are deactivated, a second cylinder deactivation operation in which a second number of cylinders among the plurality of cylinders are deactivated, and the all-cylinder operation, the cylinder deactivation mechanism being capable of switching a number of deactivated cylinders among the plurality of cylinders between the first number and the second number larger than the first number,
   wherein the determination reference value includes a second reference value and a third reference value higher than the second reference value,
   wherein the inhibiting device is configured to inhibit only the first cylinder deactivation operation if the counted deactivation time parameter is larger than or equal to the second reference value and not larger than the third reference value, and the inhibiting device is configured to inhibit both of the first cylinder deactivation operation and the second cylinder deactivation operation if the counted deactivation time parameter is larger than or equal to the third reference value, and wherein the second cylinder deactivation operation is controlled to be performed when the operation state of the internal combustion engine is in a lower load operation than the load in which the first cylinder deactivation operation is performed.

2. The apparatus according to claim 1, further comprising:
a spark plug temperature estimating device configured to calculate an estimated spark plug temperature, which is an estimated value of a temperature of a spark plug of the internal combustion engine; and
a deactivation time parameter decrementing device configured to decrease the counted deactivation time parameter if the estimated spark plug temperature is higher than a first reference value.

3. The apparatus according to claim 1, further comprising:
an addition device configured to add a predetermined value to the counted deactivation time parameter when the cylinder operation controller switches the cylinder operation from the all-cylinder operation to the cylinder deactivation operation.

4. An apparatus to control an internal combustion engine, comprising:
cylinder operation control means for switching, according to an operation state of the internal combustion engine, a cylinder operation between an all-cylinder operation in which all of a plurality of cylinders of the internal combustion engine are activated and a cylinder deactivation operation in which a part of the plurality of cylinders is deactivated, the internal combustion engine including a cylinder deactivation mechanism to deactivate the part of the plurality of cylinders;
deactivation time parameter counting means for counting a deactivation time parameter indicating a deactivation time of the part of the plurality of cylinders to calculate a counted deactivation time parameter; and
inhibiting means for inhibiting the cylinder deactivation operation if the counted deactivation time parameter calculated by the deactivation time parameter counting means is larger than or equal to a determination reference value,
wherein the deactivation time parameter counting means hold the counted deactivation time parameter as an initial value after an operation of the internal combustion engine is stopped,
wherein the deactivation time parameter counting means resumes counting the deactivation time parameter using the initial value when the internal combustion engine restarts,
wherein the cylinder operation control means are configured to switch the cylinder operation among a first cylinder deactivation operation in which a first number of cylinders among the plurality of cylinders are deactivated, a second cylinder deactivation operation in which a second number of cylinders among the plurality of cylinders are deactivated, and the all-cylinder operation, the cylinder deactivation mechanism being capable of switching a number of deactivated cylinders among the plurality of cylinders between the first number and the second number larger than the first number,
wherein the determination reference value includes a second reference value and a third reference value higher than the second reference value,
wherein the inhibiting means are configured to inhibit only the first cylinder deactivation operation if the counted deactivation time parameter is larger than or equal to the second reference value and not larger than the third reference value, and the inhibiting means are configured to inhibit both of the first cylinder deactivation operation and the second cylinder deactivation operation if the counted deactivation time parameter is larger than or equal to the third reference value, and
wherein the second cylinder deactivation operation is controlled to be performed when the operation state of the internal combustion engine is in a lower load operation than the load in which the first cylinder deactivation operation is performed.

5. The apparatus according to claim 4, further comprising:
spark plug temperature estimating means for calculating an estimated spark plug temperature, which is an estimated value of a temperature of a spark plug of the internal combustion engine; and
deactivation time parameter decrementing means for decreasing the counted deactivation time parameter if the estimated spark plug temperature is higher than a first reference value.

6. The apparatus according to claim 4, further comprising:
addition means for adding a predetermined value to the counted deactivation time parameter when the cylinder operation control means switch the cylinder operation from the all-cylinder operation to the cylinder deactivation operation.

7. A method for controlling an internal combustion engine, comprising:
switching, according to an operation state of the internal combustion engine, a cylinder operation between an all-cylinder operation in which all of a plurality of cylinders of the internal combustion engine are activated and a cylinder deactivation operation in which a part of the plurality of cylinders is deactivated;
counting a deactivation time parameter indicating a deactivation time of the part of the plurality of cylinders to calculate a counted deactivation time parameter;
inhibiting the cylinder deactivation operation if the counted deactivation time parameter is larger than or equal to a determination reference value;
holding the counted deactivation time parameter as an initial value after an operation of the internal combustion engine is stopped;
resuming counting the deactivation time parameter using the initial value when the internal combustion engine restarts;
switching the cylinder operation among a first cylinder deactivation operation in which a first number of cylinders among the plurality of cylinders are deactivated, a second cylinder deactivation operation in which a second number of cylinders among the plurality of cylinders are deactivated, and the all-cylinder operation;
inhibiting only the first cylinder deactivation operation if the counted deactivation time parameter is larger than or equal to a second reference value of the determination reference value and not larger than the third reference value; and
inhibiting both of the first cylinder deactivation operation and the second cylinder deactivation operation if the counted deactivation time parameter is larger than or equal to a third reference value of the determination reference value,
wherein the second cylinder deactivation operation is controlled to be performed when the operation state of the internal combustion engine is in a lower load operation than the load in which the first cylinder deactivation operation is performed.

8. The method according to claim 7, further comprising:
calculating an estimated spark plug temperature, which is an estimated value of a temperature of a spark plug of the internal combustion engine; and
decreasing the counted deactivation time parameter if the estimated spark plug temperature is higher than a first reference value.

9. The method according to claim 7, further comprising:
adding a predetermined value to the counted deactivation time parameter at switching the cylinder operation from the all-cylinder operation to the cylinder deactivation operation.

10. A non-transitory computer-readable recording medium having program code stored thereon which, when executed by a computer, causes the computer to perform an internal combustion engine controlling method for performing a plurality of application programs, the internal combustion engine controlling method comprising:
switching, according to an operation state of the internal combustion engine, a cylinder operation between an all-cylinder operation in which all of a plurality of cylinders of the internal combustion engine are activated and a cylinder deactivation operation in which a part of the plurality of cylinders is deactivated;
counting a deactivation time parameter indicating a deactivation time of the part of the plurality of cylinders to calculate a counted deactivation time parameter;
inhibiting the cylinder deactivation operation if the counted deactivation time parameter is larger than or equal to a determination reference value;
holding the counted deactivation time parameter as an initial value after an operation of the internal combustion engine is stopped; and
resuming counting the deactivation time parameter using the initial value when the internal combustion engine restarts,
wherein the internal combustion engine controlling method includes
switching the cylinder operation among a first cylinder deactivation operation in which a first number of cylinders among the plurality of cylinders are deactivated, a second cylinder deactivation operation in which a second number of cylinders among the plurality of cylinders are deactivated, and the all-cylinder operation,
inhibiting only the first cylinder deactivation operation if the counted deactivation time parameter is larger than or equal to a second reference value of the determination reference value and not larger than the third reference value, and
inhibiting both of the first cylinder deactivation operation and the second cylinder deactivation operation if the counted deactivation time parameter is larger than or equal to a third reference value of the determination reference value, and
wherein the second cylinder deactivation operation is controlled to be performed when the operation state of the internal combustion engine is in a lower load operation than the load in which the first cylinder deactivation operation is performed.

11. The non-transitory computer-readable recording medium according to claim 10,
wherein the internal combustion engine controlling method includes
calculating an estimated spark plug temperature, which is an estimated value of a temperature of a spark plug of the internal combustion engine, and
decreasing the counted deactivation time parameter if the estimated spark plug temperature is higher than a first reference value.

12. The non-transitory computer-readable recording medium according to claim 10,
wherein the internal combustion engine controlling method includes adding a predetermined value to the counted deactivation time parameter at switching the cylinder operation from the all-cylinder operation to the cylinder deactivation operation.

* * * * *